United States Patent Office 2,949,436
Patented Aug. 16, 1960

2,949,436

PROCESS OF POLYMERIZING STYRENE IN THE PRESENCE OF METHOXYSTYRENE POLYMER

Howard C. Haas and Pandurang M. Kamath, Arlington, Mass., assignors to Polaroid Corporation, Cambridge, Mass., a corporation of Delaware Filed June 6, 1956, Ser. No. 589,608

6 Claims. (Cl. 260—45.5)

This invention relates to polymer chemistry and more particularly to novel polymeric products and their preparation.

Principal objects of this invention are to provide novel graft copolymers and polymerization processes for their preparation.

A further object of this invention is to provide novel processes for preparing graft copolymers employing cationic catalysts.

Still further objects include the provision of novel graft copolymers of polystyrene with polymers containing recurring

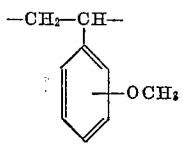

functional groups, and more particularly, poly-p-methoxystyrene, and cationic polymerization processes for the preparation of such graft copolymers.

Other objects of the invention will in part be obvious and will in part appear hereinafter.

The invention accordingly comprises the several steps and the relation and order of one or more of such steps with respect to each of the others, and the compositions of matter possessing the features and properties which are exemplified in the following detailed disclosure, and the scope of the application of which will be indicated in the claims.

For a fuller understanding of the nature and objects of the invention, reference should be had to the following detailed description taken in connection with the accompanying drawing wherein.

It has previously been proposed to effect free radical-initiated polymerization reactions in the presence of polymer molecules, thereby producing graft copolymers. Many substances, however, are not susceptible to such free radical-initiated polymerization techniques.

Graft copolymers are polymers having a backbone of one polymeric species and, at intervals along this backbone, branches of another polymeric species. Such graft copolymers are generally prepared by the polymerization of a monomer in the presence of a suitable polymer. It will be apparent that graft copolymers are quite distinct from ordinary copolymers and block or segmented copolymers.

We have now discovered that graft copolymers may be prepared using cationic catalysts for the polymerization of suitable monomers in the presence of polymers capable of being attacked by a growing carbonium ion chain. In particular, we have discovered that graft copolymers may be obtained by the cationic polymerization of styrene in the presence of polymers containing recurring functional groups of the formula

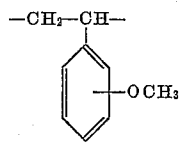

For purposes of illustration, the invention will be described in terms of the polymerization of styrene in the presence of poly-p-methoxystyrene. It is to be understood that the initial polymer containing said

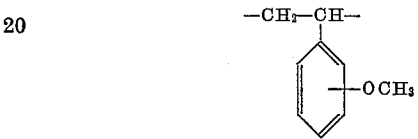

functional groups may be a copolymer of a methoxystyrene. Such graft copolymers are useful and desirable in that they possess some of the properties of each of the respective homopolymers.

The graft copolymerization reactions herein contemplated utilize a chain transfer mechanism wherein growing polystyrene chains are incorporated into the polymer chain by attachment to

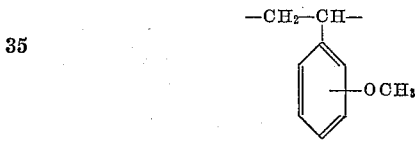

units of the initial polymer.

In general, the graft copolymers are prepared by forming a solution of the monomer and the polymer in a suitable common solvent, adding the cationic initiator, and allowing the polymerization to proceed. The reaction mixture is stirred and maintained at a constant temperature. After polymerization, the total polymeric product is precipitated and the product graft copolymer is separated from homopolymer on the basis of solubility. Examination of the infrared absorption spectrum of the graft copolymer indicates the presence of characteristic absorption bands of the respective homopolymers.

The ratio of polystyrene to poly-p-methoxystyrene in the product graft copolymer may be obtained from the carbon and hydrogen analysis of the graft copolymer. In view of the fact that the percent conversion of styrene varies from run to run, the ratio of polystyrene to poly-p-methoxystyrene in the graft copolymer, corrected for conversion, may be represented by the ratio:

$$R = \frac{\text{Mole percent polystyrene in copolymer} \times 100}{\text{Mole percent poly-p-methoxystyrene in graft} \times \text{percent conversion}}$$

Figure 1:
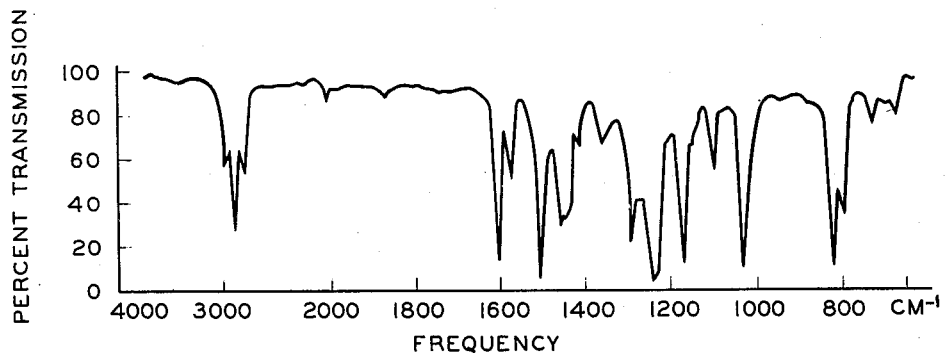
Figure 1 is the infrared absorption spectrum of poly-p-methoxystyrene.
Figure 2:
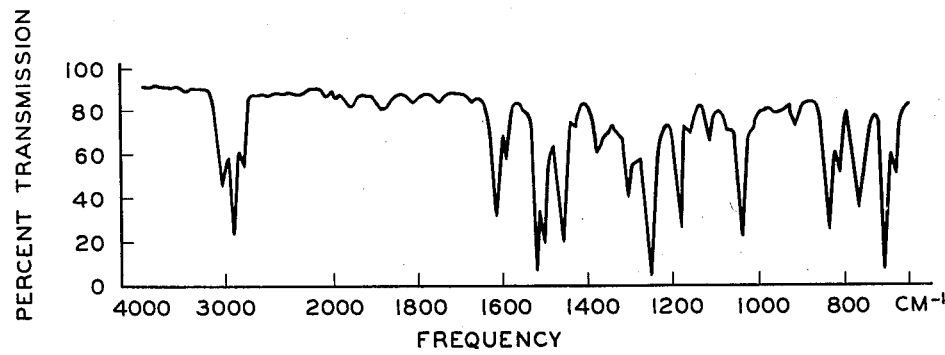
Fig. 2 is the infrared absorption spectrum of a graft copolymer prepared in accordance with the invention.
Figure 3:
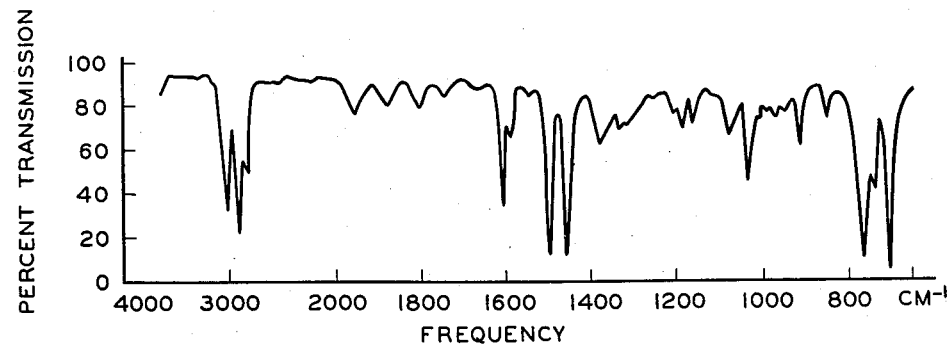
Fig. 3 is the infrared absorption spectrum of polystyrene.

The product graft copolymer was determined to be a true graft copolymer on the basis of the infrared absorption spectrum shown in Fig. 2, which was found to contain absorption bands of both poly-p-methoxystyrene and polystyrene. Infrared absorption spectra for these homopolymers are reproduced in Figs. 1 and 3, respectively. Repeated fractionation of the graft copolymer with methylcyclohexane failed to noticeably alter the shape of the infrared absorption spectrum. This, plus the fact that mixtures of polystyrene and poly-p-methoxystrene could be readily and quantitatively separated by methylcyclohexane fractionation, clearly shows that the product is a true graft copolymer and not a mixture.

The following examples of the preparation of graft copolymers in accordance with this invention are given for illustrative purposes only.

Example 1

Poly-p-methoxystyrene (0.8 g.) is dissolved in 10 cc. of nitrobenzene. Styrene (2.7 g.) and 1 cc. of carbon tetrachloride are then added, followed by 60 mg. of stannic chloride dissolved in 1 cc. of carbon tetrachloride. The resulting reaction mixture is 1.65 M in styrene, 0.377 M in poly-p-methoxystyrene and 0.0145 M in stannic chloride. Polymerization at 0° C. for approximately one hour gives 85% conversion of styrene. The total polymeric product is precipitated in methanol, dissolved in a small amount of benzene, and this solution is poured into excess methylcyclohexane. Polystyrene homopolymer present in this mixture remains soluble, and an insoluble fraction consisting of 2.27 g. of product graft copolymer is recovered. The product graft copolymer has an intrinsic viscosity of 0.95 as measured in benzene at 25° C. Analysis of this product showed 88.0% C. and 7.7% H, and a polystyrene poly-p-methoxystyrene molar ratio R, corrected for conversion, of 2.08.

Example 2

The procedure of Example 1 is repeated using 0.1 g. of poly-p-methoxystyrene, to give a reaction mixture 1.72 M in styrene, 0.0495 M in poly-p-methoxystyrene and 0.0152 M in stannic chloride. After polymerization at 0° C. for one hour, 96% of the styrene is converted. Extraction with methylcyclohexane leaves 0.327 g. of graft copolymer. Analysis of the product gives a polystyrene/poly-p-methoxystyrene molar ratio R of 2.18.

Example 3

Repeating the procedure of Example 1 using 1.71, 0.098 and 0.0151 molar solutions of styrene, poly-p-methoxystyrene and stannic chloride, respectively, 0.655 g. of graft copolymer is recovered after polymerization at 0° C. for one hour with 94% conversion. The graft copolymer has an intrinsic viscosity of 0.90 in benzene at 25° C.

Example 4

A polystyrene-poly-p-methoxystyrene graft copolymer having a molar ratio R of 2.27 is obtained by repeating Example 1 using 1.67 and 0.286 molar solutions of styrene and poly-p-methoxystyrene, respectively, with 78% conversion. The product graft copolymer has an intrinsic viscosity of 0.91 in benzene at 25° C.

Example 5

Polymerization of styrene in the presence of poly-p-methoxystyrene at 0° C. for approximately 30 minutes, employing 1.64 and 0.422 molar solutions of styrene and poly-p-methoxystyrene, respectively, results in 20.9% conversion. Stannic chloride is used in a concentration of 0.0218 mole. The reaction medium comprises 38% nitrobenzene, by volume. The product graft copolymer has a polystyrene/poly-p-methoxystyrene molar ratio R of 1.99.

The poly-p-methoxystyrene used in the above examples was prepared by a stannic chloride polymerization of pure p-methoxystyrene at 0° C., and had an intrinsic viscosity of 0.83 as measured in benzene at 25° C.

Separation of the product graft copolymer from the homopolymer is readily effected, as indicated in the above examples, by solvent extraction of the reaction mixture with a solvent which is a solvent for the homopolymer produced, i.e. polystyrene, and a nonsolvent for the original polymer, i.e., poly-p-methoxystyrene. Although methylcyclohexane has been used in the above examples, it will be understood that other solvents having the above-described solvent properties may also be used.

Although the invention has been illustrated by the use of stannic chloride as the catalyst, it is contemplated that other cationic catalysts, e.g., boron trifluoride, ferric oxide, etc., may be used.

It may be noted that with increased molar quantities of poly-p-methoxystyrene, it may be necessary to increase the quantity of stannic chloride employed. This is believed to result from complexing of stannic chloride, a Lewis acid, with poly-p-methoxystyrene, a Lewis base, reducing the equilibrium concentration of free active stannic chloride below the minimum value required to initiate polymerization.

The quantities of poly-p-methoxystyrene employed may vary over a wide range, graft copolymer having been obtained using 0.5 molar solution of the polymer. In general, polymerization should be effected at a temperature above that at which the poly-p-methoxystyrene would tend to precipitate out of solution in the reaction solvent. A suitable range of temperatures is about −40° to +40° C., and a preferred temperature is about 0° C.

The novel graft copolymers of this invention are brittle solids, polystyrene-like in their properties. They may be used to produce various rigid articles, such as containers, etc., and may be subjected to extrusion and to injection and compression molding.

Since certain changes may be made in the above products and processes without departing from the scope of the invention herein involved, it is intended that all matter contained in the above description or shown in the accompanying drawing shall be interpreted as illustrative and not in a limiting sense.

What is claimed is:

1. A process of preparing a graft copolymer comprising polymerizing styrene in the presence of a polymer containing recurring groups of the formula:

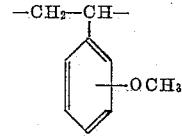

and a cationic polymerization catalyst.

2. A process as defined in claim 1, wherein said polymer is poly-p-methoxystyrene.

3. A process as defined in claim 1, wherein said cationic polymerization catalyst is stannic chloride.

4. A process as defined in claim 2, wherein said cationic polymerization catalyst is stannic chloride.

5. A process as defined in claim 1, including the step of separating graft copolymer from polystyrene produced in said polymerization by extracting the reaction mixture with a solvent for polystyrene, which solvent is a nonsolvent for said graft copolymer.

6. A process as defined in claim 2, including the step of separating product graft copolymer from polystyrene produced in said polymerization by extracting the reaction mixture with methylcyclohexane, said methylcyclohexane being a solvent for polystyrene and a nonsolvent for said graft copolymer.

References Cited in the file of this patent

UNITED STATES PATENTS

| | | |
|---|---|---|
| 2,338,741 | Soday | Jan. 11, 1944 |
| 2,610,962 | Smyers et al. | Sept. 16, 1952 |
| 2,614,089 | Harrison et al. | Oct. 14, 1952 |
| 2,755,270 | Hayes | July 17, 1956 |
| 2,798,061 | Coover | July 2, 1957 |

OTHER REFERENCES

Journal Poly. Science, volume 8, pages 257 and 260, March 1952.

Journal Polymer Science, volume 23, pages 903–913, February 1957.